United States Patent
Arai et al.

(10) Patent No.: US 8,507,115 B2
(45) Date of Patent: *Aug. 13, 2013

(54) PERPENDICULAR MAGNETIC RECORDING MEDIUM

(75) Inventors: Reiko Arai, Kanagawa (JP); Niroyuki Nakagawa, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 700 days.

This patent is subject to a terminal disclaimer.

(21) Appl. No.: 12/559,365

(22) Filed: Sep. 14, 2009

(65) Prior Publication Data
US 2010/0110588 A1    May 6, 2010

(30) Foreign Application Priority Data
Nov. 6, 2008    (JP) .................................. 2008-285661

(51) Int. Cl.
*G11B 5/667*    (2006.01)
(52) U.S. Cl.
USPC ..... 428/828.1; 428/829; 428/830; 428/831.2; 427/127
(58) Field of Classification Search
None
See application file for complete search history.

(56) References Cited

U.S. PATENT DOCUMENTS

| | | | |
|---|---|---|---|
| 7,592,080 B2 * | 9/2009 | Takenoiri et al. | 428/828.1 |
| 8,390,956 B2 * | 3/2013 | Tonooka et al. | 360/135 |
| 2006/0147760 A1 * | 7/2006 | Uwazumi et al. | 428/831.2 |
| 2007/0153419 A1 * | 7/2007 | Arai et al. | 360/131 |
| 2008/0075979 A1 * | 3/2008 | Inamura et al. | 428/828 |
| 2008/0113221 A1 * | 5/2008 | Hirayama et al. | 428/810 |
| 2009/0116137 A1 * | 5/2009 | Takekuma et al. | 360/75 |

FOREIGN PATENT DOCUMENTS

| | | |
|---|---|---|
| CN | 1996466 A | 7/2007 |
| JP | 2003/123239 | 4/2003 |
| JP | 2004/288348 | 10/2004 |
| JP | 2007/179598 | 7/2007 |
| JP | 2008/108415 | 5/2008 |

\* cited by examiner

*Primary Examiner* — Kevin Bernatz
(74) *Attorney, Agent, or Firm* — Zilka-Kotab, PC

(57) ABSTRACT

According to one embodiment, a perpendicular magnetic recording medium includes a soft magnetic underlayer having an amorphous structure or a microcrystalline structure, a first seed layer comprised of a magnetic material having an fcc crystal structure including a CoFe alloy formed on a substrate side, and a second seed layer formed on the first seed layer, the second seed layer comprised of a nonmagnetic material having an fcc crystal structure including a NiW alloy. The medium also includes an intermediate layer comprised of Ru or an alloy thereof, a magnetic recording layer, and a protective layer, wherein the layers are sequentially stacked on a substrate in the foregoing order and the protective layer is closer to the substrate than the soft magnetic underlayer. Other embodiments of magnetic recording media, and methods of fabrication, are also described.

23 Claims, 2 Drawing Sheets

PERPENDICULAR MAGNETIC RECORDING MEDIUM

RELATED APPLICATIONS

The present application claims priority from a Japanese Patent Application filed Nov. 6, 2008 under Appl. No. 2008-285661, which is incorporated herein by reference.

FIELD OF THE INVENTION

The present invention relates to a magnetic recording medium that may perform high-capacity information recording, and particularly relates to a magnetic recording medium preferable for high-density magnetic recording.

BACKGROUND OF THE INVENTION

In perpendicular magnetic recording, the magnetizations in the adjacent bits do not face each other, and therefore a stable recorded state can be achieved which is essentially suitable for high recording density. A perpendicular magnetic recording medium has a structure where a soft magnetic underlayer, an intermediate layer, and a magnetic recording layer are mainly stacked. The soft magnetic underlayer suppresses expansion of a magnetic field generated from a magnetic head so as to efficiently magnetize the magnetic recording layer. The intermediate layer magnetically separates the soft magnetic underlayer and the magnetic recording layer, and controls crystalline orientation of the magnetic recording layer. For the magnetic recording layer, a granular-type recording layer including a CoCrPt ferromagnetic alloy added with an oxide such as $SiO_2$ is typically used, which is regarded to be low in medium noise, and strong in thermal demagnetization compared with a previous CoCrPt medium.

One way to further improve performance or increase recording density is to reduce medium noise in the magnetic recording layer. In addition, a distance between the soft magnetic underlayer and the magnetic head may be reduced. As described before, the soft magnetic underlayer prevents expansion of a magnetic flux generated from the recording head, and thus assists writing of information into the magnetic recording layer. Therefore, the distance between them is reduced, thereby a magnetic field gradient of the recording head is steepened, and consequently information can be more efficiently recorded. As a method of reducing the distance between the soft magnetic underlayer and the magnetic head, reducing flying height of the magnetic head, reducing thickness of a protective film or a lubricant film, and furthermore reducing thickness of the magnetic recording layer or an intermediate layer are possible. Reduction in thickness of the protective film or the lubricating film is limited from the viewpoint of reliability. In addition, reduction in thickness of the magnetic recording layer problematically leads to degradation in thermal stability of recorded magnetization, increase in noise, and degradation in signal quality. Since the intermediate layer has an important role for controlling crystalline orientation of the magnetic recording layer, it has been an important problem that thickness of the intermediate layer is reduced while keeping properties of the magnetic recording layer intact.

A medium configuration, which has been proposed in the past, has a large thickness of an intermediate layer, and when the intermediate layer is simply thinned, properties of the recording layer are degraded, and therefore a magnetic recording medium having excellent recording/reproducing characteristics has been difficult to achieve.

Therefore, a magnetic recording medium which retains excellent recording/reproducing characteristics while reducing the thickness of the intermediate layer is desired in the art.

SUMMARY OF THE INVENTION

According to one embodiment, a perpendicular magnetic recording medium includes a soft magnetic underlayer having an amorphous structure or a microcrystalline structure, a first seed layer comprised of a magnetic material having an fcc crystal structure including a CoFe alloy formed on a substrate side, and a second seed layer formed on the first seed layer, the second seed layer comprised of a nonmagnetic material having an fcc crystal structure including a NiW alloy. The medium also includes an intermediate layer comprised of Ru or an alloy thereof, a magnetic recording layer, and a protective layer, wherein the layers are stacked on a substrate in the foregoing order and the protective layer is closer to the substrate than the soft magnetic underlayer.

According to another embodiment, a perpendicular magnetic recording medium includes a soft magnetic underlayer having an amorphous structure or a nano-crystalline structure, a first seed layer comprised of a magnetic material having an fcc crystal structure including a CoFe alloy formed on a substrate side, and a nonmagnetic layer formed between the soft magnetic underlayer and the first seed layer. The media also includes a second seed layer formed on the first seed layer, the second seed layer comprised of a nonmagnetic material having an fcc crystal structure including a NiW alloy, and an intermediate layer comprised of Ru or an alloy thereof. The media further includes a magnetic recording layer, and a protective layer, wherein the layers are stacked on a substrate in the foregoing order and the protective layer is closer to the substrate than the soft magnetic underlayer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

Figure 1:
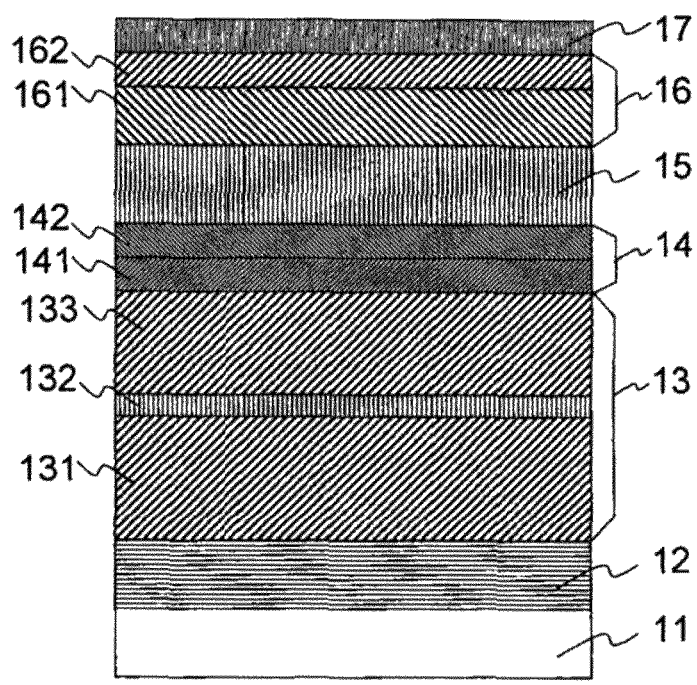
FIG. 1 is a view showing a structure of a perpendicular magnetic recording medium, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

According to one embodiment, a magnetic recording medium is intended to achieve excellent recording/reproducing characteristics with an intermediate layer having a small thickness by appropriately selecting a combination between a material and a structure of a seed layer.

While a material of the intermediate layer is variously proposed, Ru or a Ru alloy may preferably be used in some embodiments. A method is proposed to improve crystalline orientation of Ru, in which an underlayer including Ta or a Ti alloy is formed under the Ru intermediate layer. Moreover, a method is proposed, in which a material of a soft magnetic underlayer is partially used in the intermediate layer to control a function of the soft magnetic underlayer and crystal orientation of the intermediate layer together. For example, Japanese Pat. Appl. No. JP-A-2003-123239 describes a method in which a NiFe underlayer and a Ru intermediate layer are used, Japanese Pat. Appl. No. JP-A-2007-179598 describes a method in which a NiW underlayer and Ru intermediate layer are used, and Japanese Pat. Appl. No. JP-A-2004-288348 describes a method in which a Ru intermediate layer is used on a CoFe soft magnetic layer stacked on a NiFe soft magnetic layer.

A perpendicular magnetic recording medium, according to one embodiment, has a structure where a soft magnetic underlayer, a seed layer, an intermediate layer, a magnetic recording layer, and a protective layer are stacked on a substrate in the foregoing order. Accordingly, a method includes forming the foregoing layers on a substrate in the foregoing order. Note that in some embodiments, additional layers may be present/formed.

The seed layer has a stacked structure including a first seed layer as a lower layer and a second seed layer as an upper layer. The first seed layer is comprised of a magnetic alloy having a face centered cubic lattice (fcc) structure including a CoFe alloy, and a second seed layer is comprised of a nonmagnetic alloy having an fcc structure including a NiW alloy.

According to one embodiment, a seed layer including a two-layer structure may be selected, which is comprised of a soft magnetic material having an fcc structure including CoFe, and a nonmagnetic material having an fcc structure including a NiW alloy, thereby a perpendicular magnetic recording medium can be provided, which is excellent in productivity and reliability, and enables high recording density.

In a perpendicular magnetic recording medium, according to one embodiment, an adhesion layer may be formed on a substrate, a soft magnetic underlayer may be formed on the adhesion layer, a seed layer may be formed on the soft magnetic underlayer, an intermediate layer may be formed on the seed layer, and a perpendicular magnetic recording layer may be formed on the intermediate layer.

A material chosen for the adhesion layer is not particularly limited as long as the material is excellent in adhesion to a substrate and in surface flatness. However, the adhesion layer may preferably be comprised of an alloy including at least two metals from a group consisting of Ni, Al, Ti, Ta, Cr, Zr, Co, Hf, Si and B. More specifically, NiTa, AlTi, AlTa, CrTi, CoTi, NiTaZr, NiCrZr, CrTiAl, CrTiTa, CrTiNi, CoTiAl, and the like may be used.

For the soft magnetic underlayer, the material used is not particularly limited. However, some preferred characteristics include a saturation magnetic flux density (Bs) of at least about 1 tesla, uniaxial anisotropy provided in a radial direction of a disk substrate, coercive force, which is measured in a circumferential direction, of about 1.6 kA/m or less, and excellent surface flatness. Specifically, when an amorphous alloy or a nano-crystalline alloy including Co or Fe, which is added with Ta, Hf, Nb, Zr, Si, B, C or the like, is used, the above properties are easily obtained. Thickness of the layer is preferably within a range of about 20 nm to about 100 nm, though an optimum value of the thickness may be different depending on the structure and/or characteristics of the magnetic head. If the thickness is less than about 20 nm, the layer may not adequately absorb a magnetic flux from the magnetic head, leading to inadequate information writing. On the other hand, if the thickness is increased to more than about 100 nm, side writing may occur, possibly leading to degradation in recording/reproducing characteristics.

In order to further reduce noise in the soft magnetic underlayer, a nonmagnetic layer may be inserted into the soft magnetic underlayer according to one embodiment, and upper and lower soft magnetic layers may be coupled antiferromagnetically or magnetostatically via the nonmagnetic layer. When the magnetic moments are made equal between the soft magnetic layers on the upper and lower sides of the nonmagnetic layer, an undesirable magnetic flux occurs between the layers, so that a domain state is preferably further stabilized in either layer. Ru, Cr, or Cu is desirably used for the nonmagnetic layer. An optimum value of magnitude of coupling between the upper and lower soft magnetic underlayers may be different depending on a structure or characteristics of the magnetic head. In such a case, the magnitude of coupling may be adjusted by changing thickness of the nonmagnetic layer, or may be adjusted by adding a third element such as Co or Fe to the nonmagnetic layer, according to some embodiments.

The seed layer may include a two-layer structure of a first seed layer and a second seed layer in order from a substrate side, according to one embodiment. The first seed layer formed on a substrate side is intended to act as a soft magnetic underlayer and control crystallinity of the intermediate layer, and a magnetic material having an fcc structure including a CoFe alloy may be used for the layer. Specifically, a material including CoFe added with Ta, Nb, W, S, V or the like may preferably be used. Moreover, the CoFe alloy may preferably have a saturation magnetic flux density (Bs) of at least about 0.8 tesla, uniaxial anisotropy provided in a radial direction of a disk substrate, and coercive force of about 0.8 kA/m or less. A material having a good soft magnetic characteristic may be used for the first seed layer, thereby recording/reproducing characteristics can be improved. Thickness of the first seed layer may preferably be within a range of about 1 nm to about 10 nm, though an optimum value of the thickness may be different depending on a material or thickness of the second seed layer, intermediate layer, or magnetic recording layer, or depending on a characteristic of recording head. If the thickness is less than about 1 nm, an effect of the seed layer may become unfavorably inadequate. If the thickness is more than about 10 nm, crystal size may unfavorably be increased and noise may unfavorably be increased.

The second seed layer formed on a recording layer side is intended to control orientation and crystallinity of the intermediate layer, and a nonmagnetic material having an fcc structure including a NiW alloy can be used for the layer. Specifically, NiW or a NiW alloy including NiW added with Cr, V, B, Nb, Ta or the like may preferably be used. Thickness of the second seed layer may preferably be within a range of about 1 nm to about 10 nm, though an optimum value of the thickness may be different depending on a material or thickness of the intermediate layer or the magnetic recording layer, or depending on a characteristic of recording head as in the first seed layer. If the thickness is less than about 1 nm, an effect of the intermediate layer may become unfavorably inadequate. If the thickness is more than about 10 nm, crystal size may be unfavorably increased.

A nonmagnetic layer may be inserted between the soft magnetic underlayer and the first seed layer in order to further absorb a magnetic flux from a magnetic head. Thus, ferromagnetic coupling between the soft magnetic underlayer and the first seed layer is broken. For the nonmagnetic layer, the material is not particularly limited as long as the material does not degrade crystallinity or crystalline orientation of the first seed layer formed on the nonmagnetic layer. Specifically, an amorphous alloy including NiTa or Ta, or an alloy having an fcc structure or a hexagonal close-packed lattice (hcp) structure including Pd or Ti may be used. Thickness of the nonmagnetic layer may preferably be about 1 nm to about 5 nm. If the thickness is less than about 1 nm, the coupling between soft magnetic underlayer and the first seed layer may be unbroken, if the thickness is more than about 5 nm, noise may be unfavorably increased, leading to degradation in recording/reproducing characteristics.

For the intermediate layer, single Ru, an alloy having an hcp structure or fcc structure mainly including Ru being added with Cr, Ti, Ta, B or the like, or an alloy having a granular structure may be used. The intermediate layer may include a single layer film, or may include a stacked film using materials having different crystal structures. Thickness of the layer may preferably be about 16 nm or less. The Ru intermediate layer may be combined with the above seed layer, so that thickness of the intermediate layer can be reduced without degrading properties of the magnetic recording layer.

For the perpendicular magnetic recording layer, an alloy including at least Co and Pt may be used. In addition, an alloy having a granular structure mainly including CoCrPt being added with an oxide, specifically CoCrPt—SiCO$_2$, CoCrPt—MgO, CoCrPt—TaO, CoCrPt—CoO, CoCrPt—TiO and the like may be used. Furthermore, an artificial lattice film such as a (Co/Pd) multilayer film, a (CoB/Pd) multilayer film, a (Co/Pt) multilayer film, and a (CoB/Pt) multilayer film may be used. Moreover, a two-layer structure may be used, in which CoCrPt or an alloy including CoCrPt added with B, Ta, Ti or the like is formed on the granular structure film or the artificial lattice film.

For the protective layer of the perpendicular magnetic recording layer, a film about 2 nm to about 8 nm thick mainly including carbon may be formed. In addition, a lubricating layer including perfluoro-alkyl polyether may preferably be used. Thus, a highly reliable, perpendicular magnetic recording medium may be achieved.

For the substrate, a glass substrate, an Al alloy substrate coated with a NiP plated film, a ceramic substrate, or a substrate having concentric grooves formed on its surface by texture processing, etc., may be used.

Magnetic properties of each of the recording layer and the soft magnetic underlayer were evaluated using a Kerr-effect magnetometer manufactured by Neo Arc Co. Recording/reproducing characteristics were evaluated using a spin-stand, tester manufactured by Hitachi High-Technologies Corporation. A head used for evaluation was a composite magnetic head collectively having a trailing-shield-type write element and a spin-valve-type read element. The maximum linear recording density was assumed as 43.8 kfc/mm. Medium S/N was obtained as a ratio of reproducing output to integrated noise when a signal at 18.8 kfc/mm was recorded. An overwrite (OW) characteristic was obtained from an attenuation ratio of a first signal when a signal at 2.59 kfc/mm was overwritten by a signal at 20.9 kfc/mm.

Hereinafter, specific examples and embodiments are described with reference to the various figures. It should be kept in mind that this is done by way of example only and should not be construed as limiting.

FIG. 1 shows a layer configuration of an illustrative perpendicular magnetic recording medium, according to one embodiment. A glass disk substrate having a thickness of 0.635 nm and a diameter of 65 nm (2.5 inch type) was used for a substrate 11, and an adhesion layer 12, a soft magnetic underlayer 13, a seed layer 14, an intermediate layer 15, a recording layer 16, and a protective layer 17 were sequentially formed on the substrate 11 by a sputtering method. The soft magnetic underlayer 13 in this embodiment is a stacked film of a first soft magnetic underlayer 131, a nonmagnetic layer 132, and a second soft magnetic layer 133. The seed layer 14 is a stacked film of a first seed layer 141 and a second seed layer 142. The recording layer 16 is a stacked film of a first recording layer 161 and a second recording layer 162. Table 1 shows a target composition, Ar gas pressure, and thickness of each layer in the example.

TABLE 1

| | Layer | Target Composition (at %) | Ar Gas Pressure (Pa) | Thickness (nm) |
|---|---|---|---|---|
| | Adhesion Layer 12 | 65Ni—35Ta | 1 | 10 |
| Soft Magnetic Underlayer 13 | 1st Soft Mag. Layer 131 | 51Fe—34Co—10Ta—5Zr | 0.5 | 15 |
| | Nonmagnetic Layer 132 | Ru | 1 | 0.4 |
| | 2nd Soft Mag. Layer 133 | 51Fe—34Co—10Ta—5Zr | 0.5 | 5.5 |
| Seed Layer 14 | 1st Seed Layer 141 | 85.5Co—9.5Fe—5Ta | 0.5 | 7 |
| | 2nd Seed Layer 142 | 94Ni—6W | 1 | 3 |
| | Intermediate Layer 15 | Ru | 1/5 | 4/8 |
| Recording Layer 16 | 1st Recording Layer 161 | 61Co—21Cr—18Pt—6 molSiO$_2$ | 4.5 | 13 |
| | 2nd Recording Layer 162 | 64Co—12Cr—14Pt—10B | 0.6 | 3 |
| | Protective Layer 17 | C | 0.6 | 3 |

Referring to FIG. 1, first, a NiTa film of 10 nm was formed on the substrate 11 as the adhesion layer 12, then a FeCoTaZr film of 15 nm as the first soft magnetic layer 131, a Ru film of 0.4 nm as the nonmagnetic layer 132, and a FeCoTaZr film of 5.5 nm as the second soft magnetic layer 133 were sequentially formed on the NiTa film. Next, a CoFeTa film of 7 nm was formed as the first seed layer 141, and a NiW film of 3 nm as the second seed layer 142 was formed in order, then a Ru film as the intermediate layer 15 was formed at 4 nm at an Ar pressure of 1 Pa, and formed by 8 nm at an Ar pressure of 5 Pa, and then a CoCrPt—SiO$_2$ film of 13 nm as the first recording layer 161, a CoCrPtB film of 3 nm as the second recording layer 162, and a carbon film of 3 nm as the protective layer 17 were sequentially formed. Then, a lubricant including a perfluoro-alkyl polyether based material diluted by a fluorocarbon material was coated on a surface, and then the coated surface was varnished so that a perpendicular recording medium 1-1 of the example was produced. Ar was used as a sputter gas, which was added with oxygen at a partial pressure of 20 mPa when the magnetic recording layer was formed. When the protective layer 17 was formed, nitrogen was added at a partial pressure of 50 mPa with respect to an Ar pressure of 0.6 Pa during deposition.

A medium 1-2 having a thick intermediate layer as usual was prepared for comparison with the example. In the medium 1-2, NiTa was deposited by 3 nm as the first seed layer, and NiW was deposited by 7 nm as the second seed layer, then Ru was deposited as the intermediate layer by 9 nm at an Ar pressure of 1 Pa, and by 9 nm at an Ar pressure of 5 Pa. Furthermore, using the same layer configuration as the example medium 1-1, a medium 1-3 in which CoFeTa was simply deposited as the first seed layer 141 by 7 nm, a medium 1-4 in which NiW was simply deposited as the second seed layer 342 by 3 nm, and a medium 1-5 in which NiW was deposited by 3 nm on the soft magnetic underlayer 13, and CoFeTa was deposited by 7 nm thereon, were prepared.

The respective magnetic recording media of the example and the comparative example were evaluated for magnetic properties and recording/reproducing characteristics. Table 2 shows results of the evaluation. Table 2 shows a distance from the soft magnetic layer to the recording layer (total thickness of the nonmagnetic seed layer and the intermediate layer). In the medium 1-1 of the example, compared with the medium 1-2 of the comparative example having a thick intermediate layer as usual, high medium S/N in the same level as that of the medium 1-2 was obtained, and the OW characteristic was improved significantly. On the other hand, in the comparative examples 1-3 to 1-5, medium S/N was low by 1 dB or more compared with the medium of the example. The reason why the OW characteristic is seen to be improved is because the distance between the soft magnetic layer and the recording layer is reduced; thereby, head field strength is increased. From these examples, and knowing that CoFeTa was used for the first seed layer, and NiW was used for the second seed layer, excellent recording/reproducing characteristics were obtained even in the case that the Ru intermediate layer had a small thickness of about 12 nm.

TABLE 2

| Sample | 1$^{st}$ Seed Layer | 2$^{nd}$ Seed Layer | Distance from Soft Mag. Layer to Recording Layer (nm) | Medium S/N (dB) | O/W (dB) |
|---|---|---|---|---|---|
| Example 1-1 | CoFeTa | NiW | 15 | 18.1 | −44 |
| Example 1-2 | NiTa | NiW | 28 | 18.2 | −39 |
| Example 1-3 | CoFeTa | — | 12 | 16.9 | −47 |
| Example 1-4 | — | NiW | 15 | 17.3 | −45 |
| Example 1-5 | NiW | CoFeTa | 12 | 17.0 | −46 |

Next, using the same layer configuration as the medium 1-1 of the example, a relationship between magnetic properties of the recording layer and medium S/N was investigated while thickness of the first seed layer including CoFeTa was changed. Table 3 shows results of the investigation, in any layers other than the CoFeTa layer, thickness is fixed. Hc is increased with increases in thickness up to 5 nm. In the case of thickness of 5 nm or more. Hc is not substantially changed regardless of thickness. On the other hand, medium S/N tends to be improved with increase in Hc, and excellent medium-S/N characteristics of 18 dB or more were obtained in a thickness range of 3 nm to 9 nm regardless of change in thickness. When thickness was further increased, medium S/N was reduced. This is because noise was increased due to increases in thickness.

In the example, thickness of the CoFeTa film as the first seed layer was optimally 3 nm to 9 nm. However, such an optimum value may be different depending on a material or thickness of the second seed layer, the intermediate layer, or the magnetic recording layer, or depending on a head combined with the relevant medium for evaluation.

TABLE 3

| Sample | Thickness of 1$^{st}$ Seed Layer (nm) | Coercive Force Hc (kOe) | Medium S/N (dB) |
|---|---|---|---|
| 2-1 | 1 | 3.6 | 17.5 |
| 2-2 | 3 | 3.8 | 18.0 |
| 2-3 | 5 | 4.1 | 18.1 |
| 1-1 | 7 | 4.1 | 18.1 |
| 2-4 | 9 | 4.1 | 18.1 |
| 2-5 | 11 | 4.2 | 17.7 |
| 2-6 | 13 | 4.2 | 17.2 |

Using the same layer configuration as the example 1-1, a relationship between a crystal structure of CoFeTa and medium S/N was investigated while a composition ratio between Co, Fe and Ta of CoFeTa of the first seed layer was changed. In any case, thickness of the first seed layer is fixed to 7 nm. As shown in Equation 1, thickness (t2) of the second soft magnetic layer was changed such that the sum of a product of saturation magnetic flux density (Bs2) and the thickness (t2) of the second soft magnetic layer and a product of saturation magnetic flux density (Bs3) and thickness (t3) of the first seed layer was equal to a product of saturation magnetic flux density (Bs1) and thickness (t1) of the first soft magnetic layer.

$$Bs1*t1=Bs2*t2+Bs3*t3 \quad \text{Equation 1}$$

Table 4 shows results of the investigation. While the media 3-1 and 3-2 having the Ta content of 3 at % and 7 at % respectively exhibited good medium S/N, the medium 3-3 having the Ta content of 9 at % was reduced in medium S/N. Moreover, while the medium 3-4 having the Fe content of 14 at % was high in medium S/N, the medium 3-5 having the Fe content of 25 at % was reduced in medium S/N. Respective kinds of CoFeTa having the above compositions were subjected to X-ray diffraction measurement to investigate a crystal structure of CoFeTa. As a result, it was discovered that any of the media that exhibited high medium S/N also had an fcc structure, and any medium that was reduced in medium S/N had an amorphous structure or a bcc structure. That is, a composition ratio of CoFeTa for achieving a medium having excellent recording/reproducing characteristics is determined within a range where CoFeTa forms a crystalline alloy having the fcc structure.

TABLE 4

| Sample | Composition of 1$^{st}$ Seed Layer | Coercive Force Hc (kOe) | Medium S/N (dB) | Crystal Structure |
|---|---|---|---|---|
| 3-1 | Co—9.7Fe—3Ta | 4.3 | 18.0 | Crystalline (fcc) |
| 1-1 | Co—9.5Fe—5Ta | 4.1 | 18.1 | Crystalline (fcc) |
| 3-2 | Co—9.3Fe—7Ta | 4.0 | 17.9 | Crystalline (fcc) |
| 3-3 | Co—9.1Fe—9Ta | 3.8 | 17.4 | Amorphous |

TABLE 4-continued

| Sample | Composition of 1st Seed Layer | Coercive Force Hc (kOe) | Medium S/N (dB) | Crystal Structure |
|---|---|---|---|---|
| 3-4 | Co—14Fe—5Ta | 4.0 | 18.0 | Crystalline (fcc) |
| 3-5 | Co—25Fe—5Ta | 4.3 | 17.2 | Crystalline (fcc) |

Media 4-1 to 4-4 were produced using the same layer configuration as the example 1-1, in which a material of the first seed layer 141 was changed to CoFe, CoFeNb, CoFeW or CoFeB. Thickness of the first seed layer was fixed to 7 nm, and thickness of the second seed layer including NiW was fixed to 3 nm.

For comparison with the example, media 4-5 to 4-8 of a comparative example were prepared using the same layer configuration as the example 1-1, in which NiFe, NiFeTa, CoNiW or CoNiTa being a typical soft magnetic material as proposed in the Japanese Pat. Appl. No. JP-A-2003-123239 or JP-A-2007-179598 was used for a material of the first seed layer 141. In any case, thickness of the first seed layer 141 was fixed to 7 nm. Moreover, in any of the respective media of the example and the comparative example, thickness of the second soft magnetic layer was changed such that magnetic moment of a soft magnetic layer (the second soft magnetic layer and the first seed layer) on the nonmagnetic layer 132 was equal to magnetic moment of a soft magnetic layer (the first soft magnetic layer) under the nonmagnetic layer 132, as shown in example 2.

Table 5 shows magnetic properties and recording/reproducing characteristics of the example media and the comparative example media. It was discovered that any of the media 4-1 to 4-4 of the example exhibit high medium S/N and a good OW characteristic, similar to those characteristics of the medium 1-1. Among the materials, particularly in the case that CoFeTa, CoFeNb, or CoFeB was used for the first seed layer, excellent recording/reproducing characteristics are obtained. On the other hand, each of the media 4-5 to 4-8 of the comparative example was reduced in medium S/N by about 1 dB, and degraded in OW characteristic by 3 to 5 dB compared with the example medium 1-1.

diate layer, and consequently a subgrain was generated in the recording layer. It is reasoned that grain size dispersion is increased in the recording layer due to such subgrain generation, and consequently recording/reproducing characteristics are degraded.

Furthermore, soft magnetic properties of the seed materials were investigated using the samples. Table 5 collectively shows results of the investigation. Any of the seed materials used in the example and the comparative example have uniaxial anisotropy with an easy axis in the radial direction. In particular, it was known that any of CoFeTa, CoFeNb and CoFeB, which provided excellent recording/reproducing characteristics, had a small coercive force Hc in the easy axis direction, namely, had good soft magnetic properties. On the other hand, it was known that the NiFe alloy was weak in in-plane anisotropy though it had small Hc in the easy axis direction, and the CoNi alloy had large HC in the easy axis direction. That is, it was known that a material having good soft-magnetic properties was importantly used for the first seed material to obtain excellent recording/reproducing characteristics.

In the example, the CoFe alloy added with Ta, Nb, W or B was used. However, even if an element other than the additional elements combined with one another in the example is added, the same effects are obtained if the element meets the conditions that an alloy including the element has the fcc structure, uniaxial anisotropy with the easy axis in the radial direction, and good soft magnetic properties. In addition, even in a composition other than the compositions shown in the example, the same effects are obtained as long as the composition meets the above conditions. Therefore other material may be used to achieve these desired results in addition to those actually tested.

Media 5-1 to 5-3 were produced using the same layer configuration as the example 1-1, in which a material of the second seed layer 142 was changed to NiWCr, NiWB or NiWNb. Thickness of the first seed layer was 7 nm, and thickness of the second seed layer was 3 nm. Table 6 shows results of the investigation of magnetic properties and recording/reproducing characteristics of the respective recording

TABLE 5

| Sample | 1st Seed Layer | Recording Layer Hc (kOe) | Medium S/N (dB) | O/W (dB) | 1st Seed Layer Hc (Oe) | 1st Seed Layer Hk (Oe) |
|---|---|---|---|---|---|---|
| 1-1 | CoFeTa | 4.1 | 18.1 | −44 | 4.0 | 30 |
| 4-1 | CoFe | 4.3 | 17.7 | −44 | 30.0 | 65 |
| 4-2 | CoFeNb | 4.0 | 18.0 | −43 | 6.5 | 100 |
| 4-3 | CoFeW | 4.2 | 17.8 | −43 | 15.0 | 55 |
| 4-4 | CoFeB | 4.1 | 17.9 | −43 | 5.0 | 45 |
| 4-5 | NiFe | 4.4 | 17.4 | −41 | 1.0 | 3 |
| 4-6 | NiFeTa | 4.2 | 17.3 | −41 | 1.0 | 3 |
| 4-7 | CoNiW | 4.3 | 16.2 | −38 | 40.0 | 35 |
| 4-8 | CoNiTa | 4.2 | 15.9 | −39 | 45.0 | 40 |

In order to investigate a cause of degradation in detail, samples were prepared by depositing NiTa of 10 nm thickness on a glass substrate, and depositing each of the seed materials of 20 nm thickness thereon, and a crystal structure and surface flatness of each seed material were investigated. Each of the crystal structures had an fcc structure and were oriented in a (111) direction, and the seed materials used in the comparative example showed large crystal grain size, and bad surface flatness compared with the seed materials used in the example. Crystal grain size of the seed material was increased, and thereby grain size of NiW deposited thereon also increased, which reduced matching with the Ru intermelayers. It was discovered that excellent recording/reproducing characteristics were obtained as in the example medium 1-1.

TABLE 6

| Sample | 2nd Seed Layer | Recording Layer Hc (kOe) | Medium S/N (dB) | O/W (dB) |
|---|---|---|---|---|
| 1-1 | NiW | 4.1 | 18.1 | −44 |
| 5-1 | NiWCr | 4.1 | 18.0 | −44 |

TABLE 6-continued

| Sample | $2^{nd}$ Seed Layer | Recording Layer Hc (kOe) | Medium S/N (dB) | O/W (dB) |
|---|---|---|---|---|
| 5-2 | NiWB | 4.0 | 18.0 | −45 |
| 5-3 | NiWNb | 3.9 | 18.0 | −45 |

Media 6-1 and 6-2 were produced using the same layer configuration as the example 1-1, in which the thickness of the nonmagnetic layer 132, which was a Ru film, was changed from 0.6 nm to 1.2 nm. Furthermore, a medium 6-3 was produced, in which a material of the soft magnetic underlayer was made to be a nano-crystalline alloy by changing the Ta content and the Zr content, respectively. Whether FeCoTaZr in the medium 6-3 has a nano-crystalline structure or not is confirmed by cross-section TEM analysis. In this case, thickness of a Ru film as the nonmagnetic layer 132 was 0.4 nm.

For comparison with the example, using the same layer configuration as the example 1-1, a medium 6-4 was prepared, in which the Ru film as the nonmagnetic layer 132 was not formed, and a medium 6-5 was prepared, in which a material of the soft magnetic underlayer was changed to a crystal alloy, CoFeTa. The thickness of the nonmagnetic layer 132 of the medium 6-5 was 0.8 nm.

The respective magnetic recording media of the example and the comparative example were subjected to evaluation of antiferromagnetic coupling between the first and second soft magnetic layers, and to evaluate recording/reproducing characteristics. Table 7 shows results of the evaluation.

TABLE 7

| Sample | Soft Mag. Underlayer (SMU) | Crystal Structure of SMU | Thickness of Nonmagnetic Layer 132 (nm) | AFM Coupling (Oe) | Medium S/N (dB) | O/W (dB) |
|---|---|---|---|---|---|---|
| 1-1 | FeCoTaZr | Amorphous | 0.4 | 70 | 18.1 | −44 |
| 6-1 | FeCoTaZr | Amorphous | 0.6 | 30 | 18.1 | −45 |
| 6-2 | FeCoTaZr | Amorphous | 1.2 | 0 | 18.0 | −46 |
| 6-3 | FeCoTaZr | Nano-Crytalline | 0.4 | 60 | 18.0 | −45 |
| 6-4 | FeCoTaZr | Amorphous | 0.0 | 0 | 17.4 | −47 |
| 6-5 | CoFeTa | Crystalline | 0.8 | 60 | 16.9 | −41 |

Each of the media 6-1 to 6-3 of the example exhibited high medium S/N and a good OW characteristic as the medium 1-1. The reason why the OW characteristic is improved with increases in thickness of the Ru nonmagnetic layer is that antiferromagnetic (AFM) coupling between the first soft magnetic layer and the second soft magnetic layer was gradually weakened, leading to increases in effective permeability. On the other hand, in the medium 6-4 of the comparative example, in which the Ru nonmagnetic layer was not formed, while the OW characteristic was improved, the medium S/N was reduced because noise in the soft magnetic underlayer was formed of a crystalline alloy, both of the medium S/N and the OW characteristic were degraded. The medium 6-2 of the example and the medium 6-4 of the comparative example are different in medium S/N from each other though antiferromagnetic coupling is zero in each medium. This is because noise is reduced in the medium 6-2 of the example compared with the medium 6-4 of the comparative example since the first soft magnetic layer is magnetostatically coupled with the second soft magnetic layer in the medium 6-2.

That is, it was known that the soft magnetic underlayer was preferably configured such that the first soft magnetic layer was antiferromagnetically or magnetostatically coupled with the second soft magnetic layer, and a material of the soft magnetic underlayer was desirably an amorphous alloy or a nano-crystalline alloy, in order to achieve excellent recording/reproducing characteristics. Permeability of the soft magnetic underlayer was determined by the magnitude of the antiferromagnetic coupling, and an optimum value of the magnitude may be different depending on thickness of the soft magnetic underlayer, a material or thickness of the intermediate layer or the magnetic recording layer, or depending on a head combined with the relevant medium for evaluation.

Figure 2:
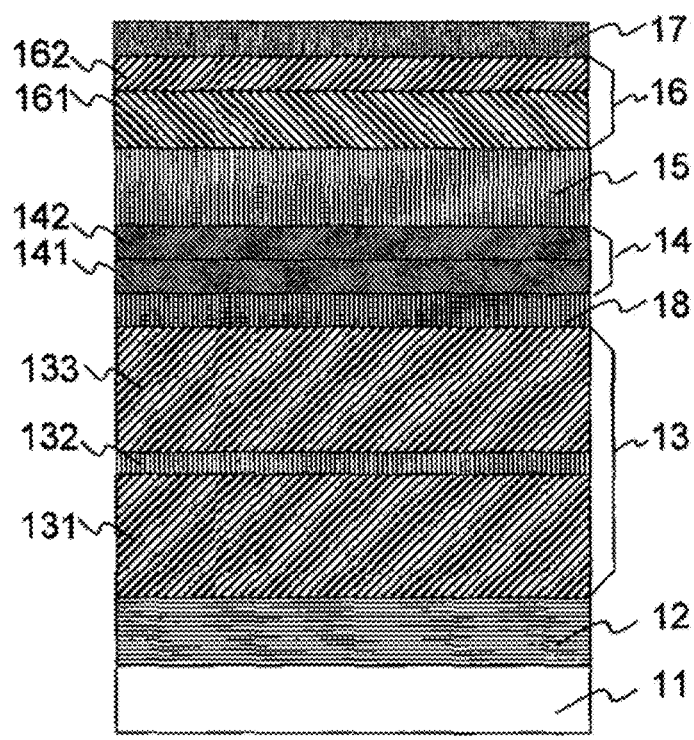
FIG. 2 is a view showing a structure of a perpendicular magnetic recording medium, according to one embodiment.

FIG. 2 shows a layer configuration of a perpendicular magnetic recording medium, according to one embodiment. A glass disk substrate having a thickness of about 0.635 nm and a diameter of about 65 nm (2.5 inch type) was used for a substrate 11, and an adhesion layer 12, a soft magnetic underlayer 13, a breaking layer 18, a seed layer 14, an intermediate layer 15, a recording layer 16, and a protective layer 17 were sequentially formed on the substrate by a sputtering method. The soft magnetic underlayer 13 is a stacked film of a first soft magnetic layer 131, a nonmagnetic layer 132, and a second soft magnetic layer 133. The seed layer 14 is a stacked film of a first seed layer 141 and a second seed layer 142. The recording layer 16 is a stacked film of a first recording layer 161 and a second recording layer 162. Table 8 shows a target composition, Ar gas pressure, and thickness of each layer in the example.

TABLE 8

| | Layer | Target Composition (at %) | Ar Gas Pressure (Pa) | Thickness (nm) |
|---|---|---|---|---|
| | Adhesion Layer 12 | 65Ni—35Ta | 1 | 10 |
| Soft Magnetic Underlayer 13 | 1st Soft Mag. Layer 131 | 51Fe—34Co—10Ta—5Zr | 0.5 | 15 |
| | Nonmagnetic Layer 132 | Ru | 1 | 0.4 |
| | 2nd Soft Mag. Layer 133 | 51Fe—34Co—10Ta—5Zr | 0.5 | 15 |
| | Breaking Layer 18 | 65Ni—35Ta | 0.5 | 2 |
| Seed Layer 14 | 1st Seed Layer 141 | 85.5Co—9.5Fe—5Ta | 0.5 | 7 |
| | 2nd Seed Layer 142 | 94Ni—6W | 1 | 5 |

TABLE 8-continued

| | Layer | Target Composition (at %) | Ar Gas Pressure (Pa) | Thickness (nm) |
|---|---|---|---|---|
| | Intermediate Layer 15 | Ru | 1/5 | 2/8 |
| Recording Layer 16 | 1st Recording Layer 161 | 61Co—21Cr—18Pt—6 molSiO$_2$ | 2 | 13 |
| | 2nd Recording Layer 162 | 64Co—12Cr—14Pt—10B | 0.6 | 3 |
| | Protective Layer 17 | C | 0.6 | 3 |

First, a NiTa film with a thickness of about 10 nm as the adhesion layer 12 was formed on the substrate 11, then a CoFeTaZr film with a thickness of about 15 nm as the first soft magnetic layer 131, a Ru film with a thickness of about 0.4 nm as the nonmagnetic layer 132, and a CoFeTaZr film with a thickness of about 15 nm as the second soft magnetic layer 133 were sequentially formed on the NiTa film. Furthermore, a NiTa film with a thickness of about 2 nm as the breaking layer 18, a CoFeTa film with a thickness of about 7 nm as the first seed layer 141, and a NiW film with a thickness of about 5 nm as the second seed layer 142 were formed in order, then a Ru film as the intermediate layer 15 was formed with a thickness of about 2 nm at an Ar pressure of 1 Pa, and formed with a thickness of about 8 nm at an Ar pressure of 5 Pa, and then a CoCrPt—SiO$_2$ film with a thickness of about 13 nm as the first recording layer 161, a CoCrPtB film with a thickness of about 3 nm as the second recording layer 162, and a carbon film with a thickness of about 3 nm as the protective layer 17 were sequentially formed. Then, a lubricant including a perfluoro-alkyl polyether based material diluted by a fluorocarbon material was coated on a surface, and then the coated surface was varnished so that a perpendicular recording medium 7-1 of the example was produced. Ar was used as a sputter gas, which was added with oxygen at a partial pressure of 20 mPa when the magnetic recording layer was formed. When the protective layer 17 was formed, nitrogen was added at a partial pressure of 50 mPa with respect to an Ar pressure of 0.6 Pa during deposition.

The magnetic recording medium of the example was evaluated for recording/reproducing characteristics. As a result, high medium S/N was achieved as in the example medium 1-1.

Next, a relationship between magnetic properties and the recording/reproducing characteristics was investigated while changing thickness of the NiTa film as the breaking layer 18. Table 9 shows results of the investigation.

TABLE 9

| Sample | Thickness of Breaking Layer (nm) | Coercive Force Hc (kOe) | Medium S/N (dB) | O/W (dB) |
|---|---|---|---|---|
| 7-2 | 0 | 4.2 | 18.1 | −43 |
| 7-3 | 0.5 | 4.2 | 18.1 | −43 |
| 7-4 | 1 | 4.3 | 18.2 | −46 |
| 7-1 | 2 | 4.3 | 18.2 | −46 |
| 7-5 | 4 | 4.3 | 17.8 | −46 |
| 7-6 | 6 | 4.3 | 17.2 | −44 |

The NiTa film was inserted by at least 1 nm, thereby the OW characteristic was improved. Soft magnetic properties of the soft magnetic underlayer were investigated. As a result, it was discovered that while FeCoTaZr of the second soft magnetic layer was ferromagnetically coupled with CoFeTa of the first seed layer up to a NiTa film thickness of about 0.5 nm, when the film thickness was increased to 1 nm or more, the ferromagnetic coupling was broken. The reason for such improvement in OW characteristic is reasoned to be that the ferromagnetic coupling between FeCoTaZr and CoFeTa is broken, so that magnetization of CoFeTa freely moves in response to an external magnetic field. In further detailed investigation of the recording/reproducing characteristics, a medium inserted with NiTa is improved in rising of output in response to current application. This means that writing of information can be adequately performed even by a small current, which is considered to be advantageous for a magnetic head having a narrow track width. The medium S/N is slightly improved with increases in thickness of the NiTa film up to 2 nm. However, when the thickness is more than 4 nm, the medium S/N is conversely reduced. The media were investigated in half value width $\Delta\theta_{50}$ of a rocking curve of Ru(0002) diffraction. As a result, any significant difference was not seen in crystal orientation of Ru between presence and absence of NiTa. The reason for improvement in medium S/N in the example is due to the OW characteristic improved by partially decoupling the soft magnetic underlayer, rather than improvement in properties of the recording layer due to improvement in crystal orientation of Ru. In addition, it was known that thickness of the NiTa film being a nonmagnetic layer was preferably between about 1 nm and about 4 nm.

Media 8-1 and 8-2 were produced using the same layer configuration as the example medium 7-1, in which a material of the breaking layer 18 was changed to each of Pd and Ti. Thickness of the breaking layer 18 was fixed to 2 nm. Table 10 shows magnetic properties and recording/reproducing characteristics of the respective recording layers.

TABLE 10

| Sample | Breaking Layer | Coercive Force Hc (kOe) | Medium S/N (dB) | O/W (dB) |
|---|---|---|---|---|
| 7-1 | NiTa | 4.3 | 18.2 | −46 |
| 8-1 | Pd | 4.4 | 18.2 | −45 |
| 8-2 | Ti | 4.4 | 18.1 | −45 |

It was known that each sample exhibited high medium S/N and a good OW characteristic as in the example medium 7-1. Soft magnetic properties of CoFeTa of the first seed layer 141 and crystal orientation of Ru were investigated. As a result, it was known that good properties were similarly obtained as in the example medium 7-1. Pd and Ti are typical materials having the fcc structure and the hcp structure respectively. From these, it was known that either an amorphous material or a crystal material may be used for the nonmagnetic layer as long as the material does not degrade crystallinity or orientation of the first seed layer formed on the nonmagnetic layer.

The following list is a description of the reference numerals and signs, and is provided for quick reference to the references consistent throughout the various figures included herein:

| | |
|---|---|
| 11: | substrate |
| 12: | adhesion layer |
| 13: | soil magnetic underlayer |
| 14: | seed layer |
| 15: | intermediate layer |
| 16: | recording layer |
| 17: | protective layer |
| 131: | first soft magnetic layer |
| 132: | nonmagnetic layer |
| 133: | second soft magnetic layer |
| 141: | first seed layer |
| 142: | second seed layer |
| 161: | first recording layer |
| 162: | second recording layer |

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular magnetic recording medium comprising:
    a soft magnetic underlayer having an amorphous structure or a microcrystalline structure;
    a first seed layer comprised of a magnetic material having an fcc crystal structure including a CoFe alloy formed on a substrate side;
    a second seed layer formed on the first seed layer, the second seed layer comprised of a nonmagnetic material having an fcc crystal structure including a NiW alloy;
    an intermediate layer comprised of Ru or an alloy thereof;
    a magnetic recording layer; and
    a protective layer;
    wherein the layers are stacked on a substrate in the foregoing order and the soft magnetic underlayer is closer to the substrate than the protective layer.

2. The perpendicular magnetic recording medium according to claim 1, wherein the CoFe alloy includes at least one of Ta, W, Nb, B, and V.

3. The perpendicular magnetic recording medium according to claim 1, wherein the soft magnetic underlayer includes a first soft magnetic layer and a second soft magnetic layer, wherein the first and second soft magnetic layers are stacked with a nonmagnetic layer interposed between them.

4. The perpendicular magnetic recording medium according to claim 1, wherein the intermediate layer has a thickness of no greater than about 8 nm.

5. The perpendicular magnetic recording medium according to claim 4, wherein a signal-to-noise (S/N) ratio of the perpendicular magnetic recording medium is no less than about 18, and wherein an overwrite (OW) characteristic in dB of the perpendicular magnetic recording medium is less than about −42, wherein the OW characteristic is an attenuation ratio of a first signal when a signal at 2.59 kfc/mm is overwritten by a signal at 20.9 kfc/mm.

6. The perpendicular magnetic recording medium according to claim 1, wherein the intermediate layer has a thickness of no greater than about 4 nm.

7. The perpendicular magnetic recording medium according to claim 6, wherein a signal-to-noise (S/N) ratio of the perpendicular magnetic recording medium is no less than about 18, and wherein an overwrite (OW) characteristic in dB of the perpendicular magnetic recording medium is less than about −42, wherein the OW characteristic is an attenuation ratio of a first signal when a signal at 2.59 kfc/mm is overwritten by a signal at 20.9 kfc/mm.

8. A perpendicular magnetic recording medium comprising:
    a soft magnetic underlayer having an amorphous structure or a nano-crystalline structure;
    a first seed layer comprised of a magnetic material having an fcc crystal structure including a CoFe alloy formed on a substrate side;
    a nonmagnetic layer formed between the soft magnetic underlayer and the first seed layer;
    a second seed layer formed on the first seed layer, the second seed layer comprised of a nonmagnetic material having an fcc crystal structure including a NiW alloy;
    an intermediate layer comprised of Ru or an alloy thereof;
    a magnetic recording layer; and
    a protective layer,
    wherein the layers are stacked on a substrate in the foregoing order and the soft magnetic underlayer is closer to the substrate than the protective layers.

9. The perpendicular magnetic recording medium according to claim 8, wherein the nonmagnetic layer has an amorphous structure.

10. The perpendicular magnetic recording medium according to claim 8, wherein the nonmagnetic layer has an fcc crystal structure or an hcp crystal structure.

11. The perpendicular magnetic recording medium according to claim 8, wherein the CoFe alloy includes at least one of Ta, W, Nb, B, and V.

12. The perpendicular magnetic recording medium according to claim 8, wherein the soft magnetic underlayer includes a first soft magnetic layer and a second soft magnetic layer, the first and second soft magnetic layers being stacked with a nonmagnetic layer interposed between them.

13. The perpendicular magnetic recording medium according to claim 8, wherein the intermediate layer has a thickness of no greater than about 8 nm.

14. The perpendicular magnetic recording medium according to claim 13, wherein a signal-to-noise (S/N) ratio of the perpendicular magnetic recording medium is no less than about 18, and wherein an overwrite (OW) characteristic in dB of the perpendicular magnetic recording medium is less than about −42, wherein the OW characteristic is an attenuation ratio of a first signal when a signal at 2.59 kfc/mm is overwritten by a signal at 20.9 kfc/mm.

15. The perpendicular-magnetic recording medium according to claim 8, wherein the intermediate layer has a thickness of no greater than about 2 nm.

16. The perpendicular magnetic recording medium according to claim 15, wherein a signal-to-noise (S/N) ratio of the perpendicular magnetic recording medium is no less than about 18, and wherein an overwrite (OW) characteristic in dB of the perpendicular magnetic recording medium is less than about −42, wherein the OW characteristic is an attenuation ratio of a first signal when a signal at 2.59 kfc/mm is overwritten by a signal at 20.9 kfc/mm.

17. A method for forming a perpendicular magnetic recording medium, comprising:
    forming a soft magnetic underlayer having an amorphous structure or a nano-crystalline structure;
    forming a first seed layer comprised of a magnetic material having an fcc crystal structure including a CoFe alloy on a substrate side;
    forming a nonmagnetic layer between the soft magnetic underlayer and the first seed layer;

forming a second seed layer on the first seed layer, the second seed layer comprised of a nonmagnetic material having an fcc crystal structure including a NiW alloy;

forming an intermediate layer comprised of Ru or an alloy thereof;

forming a magnetic recording layer; and forming a protective layer, wherein the layers are formed sequentially on a substrate in the foregoing order.

18. The method according to claim 17, wherein the CoFe alloy includes at least one of Ta, W, Nb, B, and V.

19. The method according to claim 17, wherein the soft magnetic underlayer includes a first soft magnetic layer and a second soft magnetic layer, wherein the first and second soft magnetic layers are stacked with a nonmagnetic layer interposed between them.

20. The method according to claim 17, wherein the intermediate layer is formed to a thickness of no greater than about 12 nm.

21. The method according to claim 20, wherein a signal-to-noise (S/N) ratio of the perpendicular magnetic recording medium is no less than about 18, and wherein an overwrite (OW) characteristic in dB of the perpendicular magnetic recording medium is less than about −42, wherein the OW characteristic is an attenuation ratio of a first signal when a signal at 2.59 kfc/mm is overwritten by a signal at 20.9 kfc/mm.

22. The method according to claim 17, wherein the intermediate layer is formed to a thickness of no greater than about 4 nm.

23. The method according to claim 22, wherein a signal-to-noise (S/N) ratio of the perpendicular magnetic recording medium is no less than about 18, and wherein an overwrite (OW) characteristic in dB of the perpendicular magnetic recording medium is less than about −42, wherein the OW characteristic is an attenuation ratio of a first signal when a signal at 2.59 kfc/mm is overwritten by a signal at 20.9 kfc/mm.

* * * * *

UNITED STATES PATENT AND TRADEMARK OFFICE
CERTIFICATE OF CORRECTION

PATENT NO. : 8,507,115 B2  
APPLICATION NO. : 12/559365  
DATED : August 13, 2013  
INVENTOR(S) : Arai et al.

Page 1 of 1

It is certified that error appears in the above-identified patent and that said Letters Patent is hereby corrected as shown below:

In the specification:

col. 5, line 19 replace "unbroken, if" with --unbroken. If--;

col. 7, line 21 replace "342" with --142--;

col. 7, line 62 replace "investigation, in" with --investigation. In--;

col. 15, line 4 replace "soil magnetic underlayer" with --soft magnetic underlayer--.

Signed and Sealed this  
First Day of October, 2013

Teresa Stanek Rea  
*Deputy Director of the United States Patent and Trademark Office*